(12) United States Patent
Maeda

(10) Patent No.: US 7,874,014 B2
(45) Date of Patent: Jan. 18, 2011

(54) CONTENT DISTRIBUTION SERVER AND CONTENT DISTRIBUTION SYSTEM USING THE SAME

(75) Inventor: Yukitoshi Maeda, Osaka (JP)

(73) Assignee: Heartland Co., Ltd., Osaka-shi (JP)

( * ) Notice: Subject to any disclaimer, the term of this patent is extended or adjusted under 35 U.S.C. 154(b) by 774 days.

(21) Appl. No.: 11/910,835

(22) PCT Filed: Apr. 5, 2006

(86) PCT No.: PCT/JP2006/307200

§ 371 (c)(1),
(2), (4) Date: Oct. 5, 2007

(87) PCT Pub. No.: WO2006/109640

PCT Pub. Date: Oct. 19, 2006

(65) Prior Publication Data

US 2009/0063859 A1     Mar. 5, 2009

(30) Foreign Application Priority Data

Apr. 6, 2005     (JP) .............................. 2005-109394

(51) Int. Cl.
*G06F 7/04*     (2006.01)
*G06F 12/14*    (2006.01)
*H04N 7/16*     (2006.01)

(52) U.S. Cl. .......................... 726/29; 713/168; 380/201

(58) Field of Classification Search ................ 713/168; 726/29; 380/201

See application file for complete search history.

(56) References Cited

U.S. PATENT DOCUMENTS 6,681,017 B1 *  1/2004  Matias et al. ............... 380/277

(Continued)

FOREIGN PATENT DOCUMENTS

JP            969044 A      3/1997

(Continued)

OTHER PUBLICATIONS

International Search Report of PCT/JP2006/307200, date of mailing Jun. 20, 2006.

*Primary Examiner*—Michael Pyzocha
(74) *Attorney, Agent, or Firm*—Westerman, Hattori, Daniels & Adrian, LLP

(57) ABSTRACT

The present invention relates to a content distribution server or the like, capable of more surely preventing an unauthorized use of a content. Content distribution servers 2 and 3 are arranged to be connectable via a telecommunication circuit to a user terminal device, and include: a distribution-content storing section 14 for storing a distribution content file composed of: content data; and a regulatory program including a first key for regulating reproducing the content data; a key storing section 15 for storing a second key which forms a pair with the first key; a key generating section 34 for generating, when receiving the terminal identification information transmitted from the user terminal device, a third key including the received terminal identification information and information of the second key; and transmitting controllers 16 and 34 for transmitting the third key to the user terminal device. When the distribution content file is opened on the user terminal device, the regulatory program transmits the terminal identification information to the content distribution servers 2 and 3 before the content data are reproduced.

9 Claims, 9 Drawing Sheets

U.S. PATENT DOCUMENTS

| | | | |
|---|---|---|---|
| 6,848,047 B1 * | 1/2005 | Morikawa et al. | 713/159 |
| 7,260,721 B2 * | 8/2007 | Tanaka et al. | 713/170 |
| 7,404,076 B2 * | 7/2008 | Nakano et al. | 713/150 |
| 2002/0147918 A1 * | 10/2002 | Osthoff et al. | 713/193 |
| 2003/0002680 A1 * | 1/2003 | Akiyama et al. | 380/278 |
| 2005/0021783 A1 * | 1/2005 | Ishii | 709/229 |
| 2005/0049970 A1 * | 3/2005 | Sato et al. | 705/51 |
| 2005/0207378 A1 * | 9/2005 | Zaitsu | 370/338 |
| 2006/0168253 A1 * | 7/2006 | Baba et al. | 709/229 |
| 2007/0044157 A1 * | 2/2007 | Taguchi et al. | 726/27 |
| 2007/0088945 A1 * | 4/2007 | Ohmori et al. | 713/153 |

FOREIGN PATENT DOCUMENTS

| | | |
|---|---|---|
| JP | 103428 A | 1/1998 |
| JP | 2002312052 A1 | 10/2002 |
| JP | 200329861 A | 1/2003 |
| JP | 200454451 A | 2/2004 |
| JP | 2004139539 A | 5/2004 |
| JP | 2004171377 A | 6/2004 |
| JP | 2004295388 A | 10/2004 |
| JP | 2004362401 A | 12/2004 |

* cited by examiner

Fig. 5

| Distribution content file name | Second key | Product ID |
|---|---|---|
| A | Aa | A001 |
| | | A002 |
| | | A003 |
| B | Bb | B001 |
| | | B002 |
| | | B003 |
| C | Cc | C001 |
| | | C002 |
| ⋮ | ⋮ | ⋮ |

Fig. 6

| Distribution content file name | Product ID | The number of times that third key can be generated | Past generation record of third key | Period during which third key can be generated |
|---|---|---|---|---|
| A | A001 | 1 | 1 | 2005.4.1-2005.9.30 |
| A | A002 | 1 | 1 | 2005.4.1-2005.9.30 |
| A | A003 | 1 | 0 | 2005.4.1-2005.6.30 |
| B | B001 | 2 | 1 | 2005.4.1-2005.9.30 |
| B | B002 | 2 | 2 | 2005.4.1-2005.9.30 |
| B | B003 | 2 | 0 | 2005.5.1-2005.6.30 |
| C | C001 | 1 | 1 | 2005.4.1-2005.4.30 |
| C | C002 | 1 | 1 | 2005.4.1-2005.4.30 |
| ... | ... | ... | ... | ... |

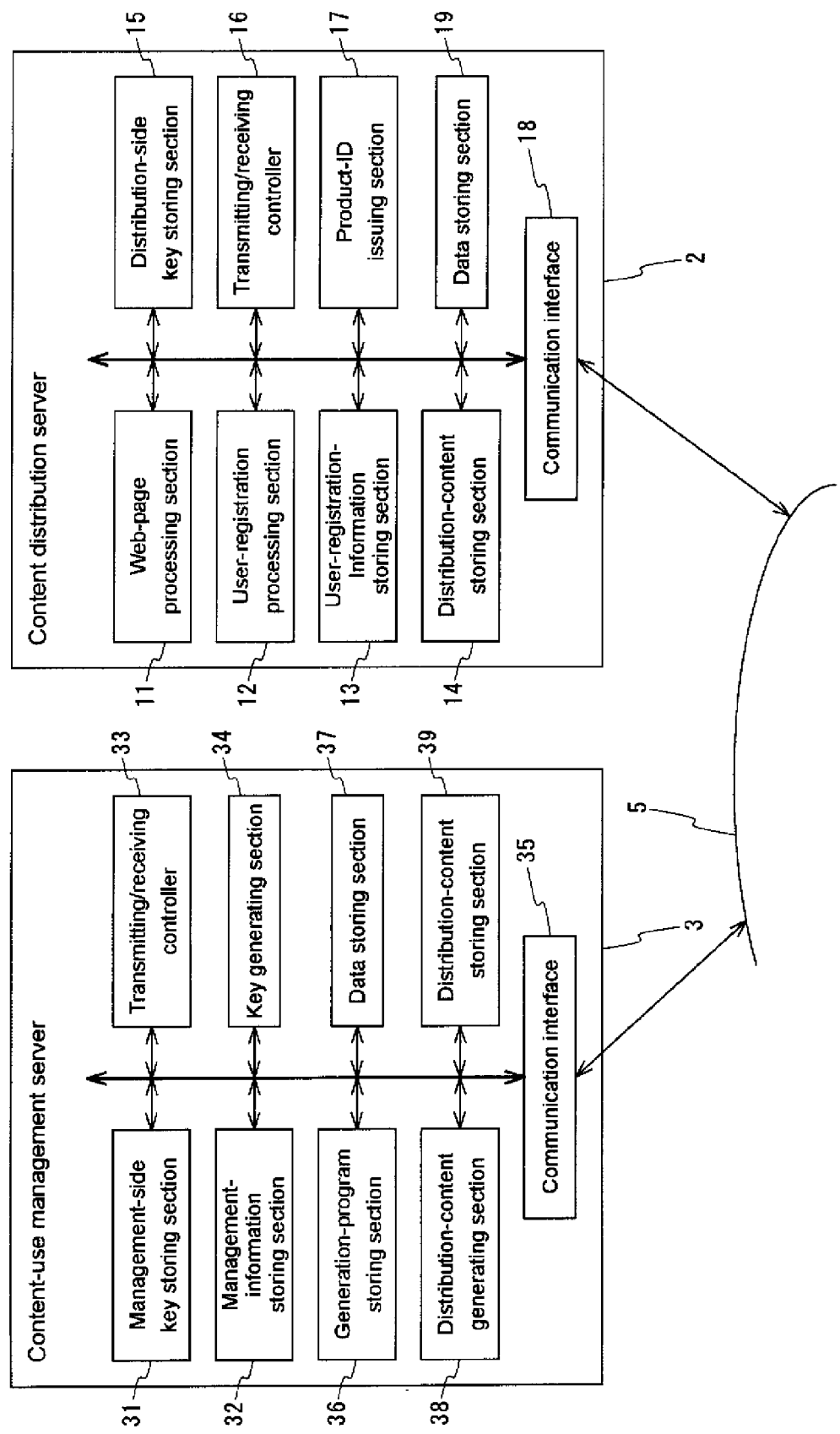

CONTENT DISTRIBUTION SERVER AND CONTENT DISTRIBUTION SYSTEM USING THE SAME

TECHNICAL FIELD

The present invention relates to a content distribution server which is arranged to be connectable via a telecommunication circuit to a user terminal device, and is configured such that in response to a request from the user terminal device, various kinds of content files are transmitted, and a content distribution system using the same.

BACKGROUND ART

In recent years, an online commerce is widely practiced using a content distribution system, in which a content distribution server storing a file related to a content such as a game, music, a movie, a novel, or the like, and a user terminal device of a user who uses the content are connected via a telecommunication circuit such as Internet, and a file related to the content within the content distribution server can be downloaded into the user terminal device.

As such a content distribution system, there is proposed a system disclosed in Japanese Unexamined Patent Application Publication No. 2004-171377, for example, and the content distribution system is configured such that a user terminal device for transmitting an identification code of a content file; an authentication server for receiving the identification code from the user terminal device to authenticate the identification code; and a distribution server, in which a content file is stored, for transmitting the content file to the user terminal device are connected via Internet.

The identification code of the content file is described in a card or the like appropriately sold. A user purchases the card on which the identification code related to a desired content is described so that the identification code is known, inputs the identification code into the user terminal device, and transmits to the authentication server.

The authentication server is provided with a storing section in which the identification code and data indicating whether the identification code is an authenticated code are stored in a manner to be associated with each other, and upon receipt of the identification code transmitted from the user terminal device, refers to the data stored in the storing section to confirm whether the received identification code is the authenticated code. In the case of not the authenticated code, the authentication server transmits the identification code and an address of the user terminal device to the distribution server, and updates the data stored in the storing section to change the identification code to the authenticated code. In the case of the authenticated code, the authentication server sends back an error message to the user terminal device.

When receiving the identification code and the address of the user terminal device which are transmitted from the authentication server, the distribution server transmits a content file corresponding to the received identification code to the user terminal device based on the received address of the user terminal device.

According to the thus-configured content distribution system, whether the identification code is the authenticated code is managed by the authentication server, and the content file is transmitted only once per identification code to the user terminal device from the distribution server, and thus, an unauthorized use of the content by using a used identification code which is wrongly obtained by the user is prevented.

Patent Document 1: Japanese Unexamined Patent Application Publication No. 2004-171377

DISCLOSURE OF THE INVENTION

Problem Invention is to Solve

However, in the above-described conventional content distribution system, when the content file is transmitted from the distribution server to the user terminal device and stored therein, it is not possible to restrict the use of the content after this time. Thus, the content file is illegally copied and a third party can use the copied file, and so on. Thereby, there arises a problem in that it is not possible to prevent the unauthorized use of the content.

The present invention has been achieved in view of the above-described circumstances, and an object thereof is to provide a content distribution server capable of more surely preventing an unauthorized use of a content, and a content distribution system using the same.

Means for Resolving the Problem

To achieve the above-described object, the present invention is a content distribution server arranged to be connectable via a telecommunication circuit to a user terminal device, and comprises:

a distribution-content storing section which stores a distribution content file subject to distribution, the distribution content file being composed of: content data; and a regulatory program for enforcing a regulation reproducing the content data, the regulatory program including a first key required for the regulation;

a key storing section for storing a second key which forms a pair with the first key;

a key generating section for generating, when receiving the terminal identification information transmitted from the user terminal device, based on the received terminal identification information and the second key stored in the key storing section, a third key including these pieces of information; and a transmitting controller for transmitting, in response to a request from the user terminal device, to the user terminal device the distribution content file stored in the distribution-content storing section, and transmitting to the user terminal device the third key generated by the key generating section, wherein the regulatory program is configured to:

when the distribution content file is opened on the user terminal device at least for a first time, firstly execute the regulatory program, and thereafter, reproduce the content data; and to perform a process in which on the user terminal device, the terminal identification information based on unique information of the user terminal device is generated and is transmitted to the content distribution server, a process in which the third key transmitted from the content distribution server is received, information corresponding to the second key and the terminal identification information are each recognized from the received third key, whether the recognized second key is a key which forms a pair with the first key in the regulatory program is confirmed, and whether the recognized terminal identification information agrees with the generated terminal identification information is confirmed, and a process in which when the recognized second key is the key which forms a pair with the first key and the recognized terminal identification information agrees with the generated terminal identification information, the content data are reproduced.

According to the present invention, firstly, a distribution-content storing section is stored with a distribution content file composed of: content data; and a regulatory program for enforcing a regulation reproducing the content data, the regulatory program including a first key required for the regulation. A key storing section is stored with a second key which forms a pair with the first key.

The content data include data related to information of text, audio, video, or the like, and a computer program, that is, data-formatted music, movie, novel, or the like, and game software, for example. When the music is converted into a data format, the reproducing means to output a sound of the music to a speaker of the user terminal device; when the movie is converted into a data format, it means to project the movie on a display device of the user terminal device; when the novel or the like is converted into a data format, it means that sentences of the novel or the like are displayed on the display device; and when the game software is concerned, it means to render usable the game software on the user terminal device.

Further, the content data may be configured not to include a reproducing program for reproducing the content data, and to be reproduced by an appropriate reproducing program previously stored on a side of the user terminal device. Alternatively, the content data may be configured to include the reproducing program, and to be reproduced on the side of the user terminal device by the reproducing program.

Thereafter, when the content distribution server is accessed via a telecommunication circuit from the user terminal device, and a distribution request for a specific content or a content selected by a user is received by the transmitting controller of the server, the distribution content file stored in the distribution-content storing section is transmitted to the user terminal device, and stored therein.

Subsequently, when the user opens the distribution content file stored in the user terminal device, the regulatory program is firstly executed. Then, according to the regulatory program, the terminal identification information based on the unique information of the user terminal device such as a CPU number, a hard disk number, or the like, for example, is generated, and is transmitted to the content distribution server.

The terminal identification information transmitted from the user terminal device is received by the key generating section of the content distribution server, and based on the received terminal identification information and the second key stored in the key storing section, the third key including these pieces of information is generated. The generated third key is sent back, under the control of the transmitting controller, to the user terminal device which has transmitted the terminal identification information.

The third key sent back from the content distribution server is received by the user terminal device according to the regulatory program, and from the received third key, information each corresponding to the second key and the terminal identification information are recognized. Then, whether the recognized second key is a key which forms a pair with the first key in the regulatory program is confirmed, and whether the recognized terminal identification information agrees with the generated terminal identification information is confirmed.

Subsequently, when the recognized second key is the key which forms a pair with the first key and the recognized terminal identification information agrees with the generated terminal identification information, a process in which the content data of the distribution content file are reproduced is performed, and as a result, the content data are reproduced on the user terminal device.

Thus, according to the present invention, unless the second key in the third key transmitted from the content distribution server forms a pair with the first key in the regulatory program of the distribution content file, and the terminal identification information in the third key agrees with the terminal identification information of the user terminal device, the reproduction of the content data in the distribution content file is regulated by the regulatory program. Thus, even when the distribution content file is illegally copied, and in addition, the information related to the third key is known, the terminal identification information differs depending on each user terminal device, and therefore, the regulation by the regulatory program cannot be canceled. Thereby, the unauthorized use of the content can be effectively prevented.

The distribution-content storing section may be configured to be stored with a plurality of distribution content files each provided with the different content data, and the regulatory program may be configured such that the first key is differed depending on the content data, and may be configured to transmit, upon performing a process for transmitting the terminal identification information to the content distribution server, the content identification information for identifying the content data, together with the terminal identification information, the key storing section may be stored with the content identification information and the second key which forms a pair with the first key in the regulatory program corresponding to the content data specified by the content identification information in a manner to be associated with each other, the key generating section may be configured, when receiving the terminal identification information and the content identification information transmitted from the user terminal device, to refer to data stored in the key storing section based on the received content identification information, recognize the second key associated with the content identification information, and generate, based on the recognized second key and the received terminal identification information, the third key including these pieces of information.

Herein, regarding the content identification information, the content identification information previously informed to the user is inputted by the user and transmitted, or the content identification information included in the distribution content file is transmitted, for example.

In this manner, when the first key in the regulatory program is changed according to the content data, the second key which forms a pair with the first key can be changed by each content data. Thus, a misappropriation or the like of the third key among the content data (distribution content files) can be prevented, and thus, the unauthorized use of the content can be more surely prevented.

The key generating section may be configured to confirm, upon generating the third key, whether a certain condition previously set by each content identification information is satisfied, and when satisfied, generate the third key.

In this manner, the use of the user can be finely restricted by each content identification information, that is, by each content data, and thus, the unauthorized use of the content can be more effectively prevented. Specifically, for example, when the number of times of a past generation record of the third key does not reach the number of times that the third key can be generated, or in the case of within a period during which the third key can be generated, the third key is generated.

The distribution-content storing section may be stored with a plurality of distribution content files each provided with the different content data, the regulatory program may be configured such that the first key is differed depending on the content data, and may be configured, upon performing a process for transmitting the terminal identification information to the content distribution server, to transmit distribution-file identification information for individually identifying the distribution content files, the distribution-file identification information being set by each distribution content file transmitted to the user terminal device, together with the terminal identification information, the key storing section may be stored with the distribution-file identification information and the second key which forms a pair with the first key in the regulatory program in the distribution content file specified by the distribution-file identification information in a manner to be associated with each other, the key generating section, when receiving the terminal identification information and the distribution-file identification information transmitted from the user terminal device, may refer to data stored in the key storing section based on the received distribution-file identification information, recognize the second key associated with the distribution-file identification information, and generate, based on the recognized second key and the received terminal identification information, the third key including these pieces of information.

Herein, similar to the above-described case, regarding the distribution-file identification information, the distribution-file identification information previously informed to the user is inputted by the user and transmitted, or the distribution-file identification information included in the distribution content file is transmitted, for example.

In this manner also, similar to the above-described case, the first key in the regulatory program is changed by each content data, and the second key which forms a pair with the first key is changed by each content data, thereby preventing a misappropriation or the like of the third key among the content data (distribution content files), hence, favorable.

The key generating section may be configured to confirm, upon generating the third key, whether a certain condition previously set by each distribution-file identification information is satisfied, and when satisfied, generate the third key. In this manner, the use of the user can be finely restricted by each distribution-file identification information, that is, by each user, and hence, favorable.

The distribution-content storing section may be configured to be stored with a distribution content file provided with content data encrypted by the first key in the regulatory program, and the regulatory program may be configured to decode, upon performing a process for reproducing the content data, the content data by the second key. In this manner, the unauthorized use of the content can be more effectively prevented.

The regulatory program may be configured to perform a process for confirming whether an execution is a first time, and when the execution is the first time, the regulatory program may further perform, in addition to each of the above-described processes, a process for storing the generated terminal identification information into a storing section of the user terminal device, and when the execution is other than the first time, the regulatory program may perform a process in which the terminal identification information is generated again, and whether the generated terminal identification information agrees with the terminal identification information stored in the storing section of the user terminal device, and when agreement is determined, a process for reproducing the content data.

For example, when it is configured such that only when the distribution content file is opened for the first time, the regulatory program is executed, after the regulation by the regulatory program is cancelled when the regulatory program is executed once, the content is rendered usable without any restrictions. Therefore, it is probable that the distribution content file is illegally copied and used.

Thus, when it is designed such that at the time of the execution for the second time and so forth also, the terminal identification information is confirmed, even when the distribution content file is copied, the content data in the distribution content file cannot be reproduced if the terminal identification information differs. Therefore, the unauthorized use of the content can be more surely prevented. Further, at the time of the execution for the second time and so forth, a transmission and a reception of the data are not performed between the user terminal device and the content distribution server, and thus, the regulation by the regulatory program can be effectively cancelled. It is noted that whether the number of times of execution of the regulatory program is the first time can be determined whether the terminal identification information is stored in the appropriate storing section of the user terminal device, for example.

The content distribution server may be configured to further comprise: a data storing section for storing the content data; and a distribution-content generating section for generating the distribution content file by adding the regulatory program to the content data stored in the data storing section, generating the second key which forms a pair with the first key of the regulatory program, and storing the generated distribution content file into the distribution-content storing section and the generated second key into the key storing section.

In this manner, by the distribution content generating section, the distribution content file composed of the content data and the regulatory program, and the second key which forms a pair with the first key in the regulatory program of the distribution content file can be effectively generated.

The present invention relates to a content distribution system configured such that the content distribution server and the user terminal device are connected via a telecommunication circuit, and according to the present invention, the unauthorized use of the content can be effectively prevented, as described above.

Effects of the Invention

As described above, according to the content distribution server and a content distribution system using the same according to the present invention, an unauthorized use of a content can be more surely prevented.

BRIEF DESCRIPTION OF THE DRAWINGS

FIG. 5 is an explanatory diagram showing a data configuration of data stored in a distribution-side key storing section according to the embodiment;

FIG. 6 is an explanatory diagram showing a data configuration of data stored in a management-information storing section according to the embodiment;

FIG. 10 is a block diagram showing a schematic configuration of a content distribution server and a content-use management server according to another embodiment of the present invention.

LEGEND

Figure 1:
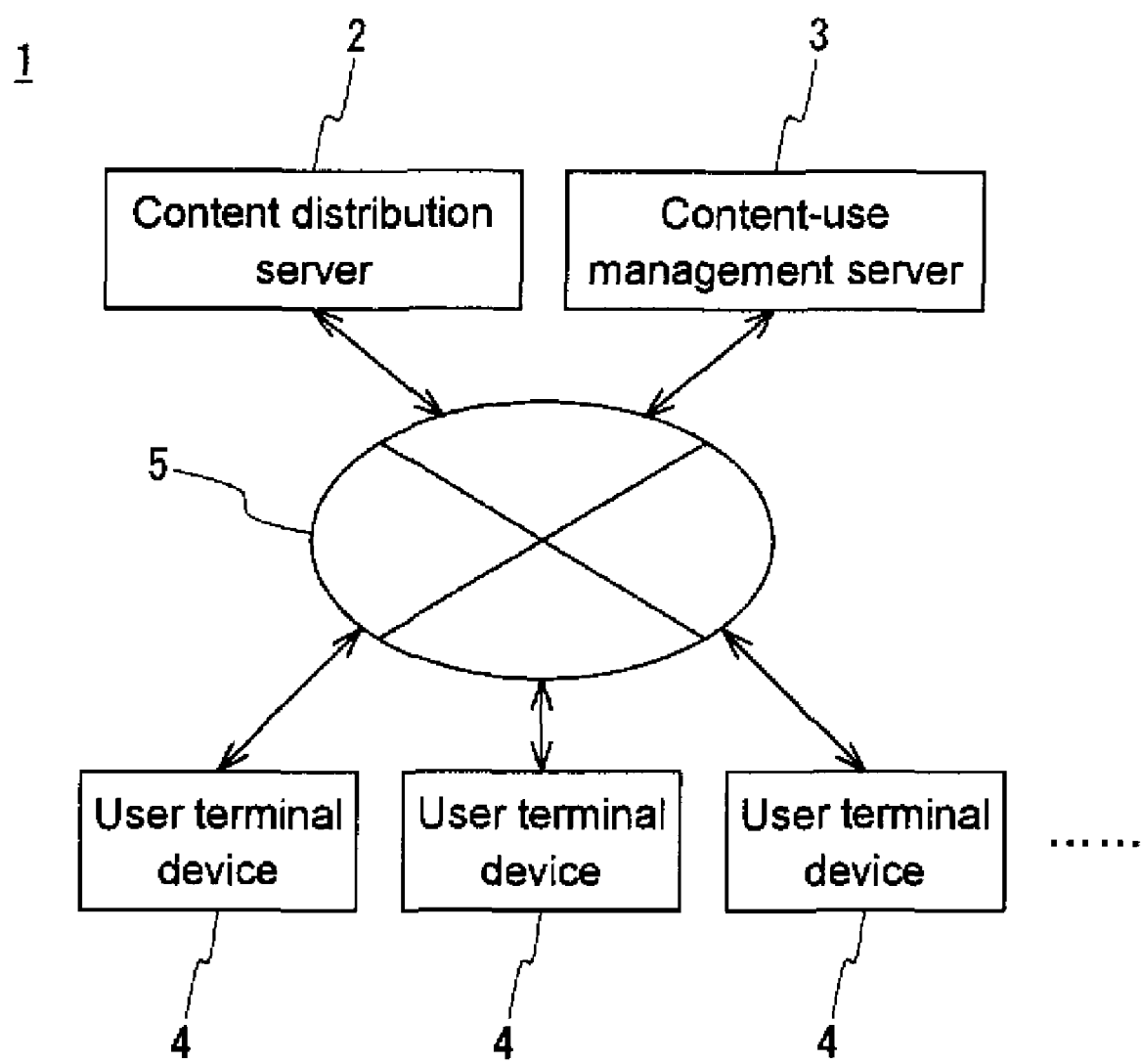
FIG. 1 is a block diagram showing a schematic configuration of a content distribution system according to one embodiment of the present invention.

1 Content distribution system
2 Content distribution server
3 Content-use management server
4 User terminal device
5 Internet
11 Web-page processing section
12 User-registration processing section
13 User-registration-information storing section
14 Distribution-content storing section
15 Distribution-side key storing section
16 Transmitting/receiving controller
17 Product-ID issuing section
19 Data storing section
20 Generation-program storing section
21 Distribution-content generating section
31 Management-side key storing section
32 Management-information storing section
33 Transmitting/receiving controller
34 Key generating section
36 Generation-program storing section

BEST MODE FOR CARRYING OUT THE INVENTION

Figure 2:
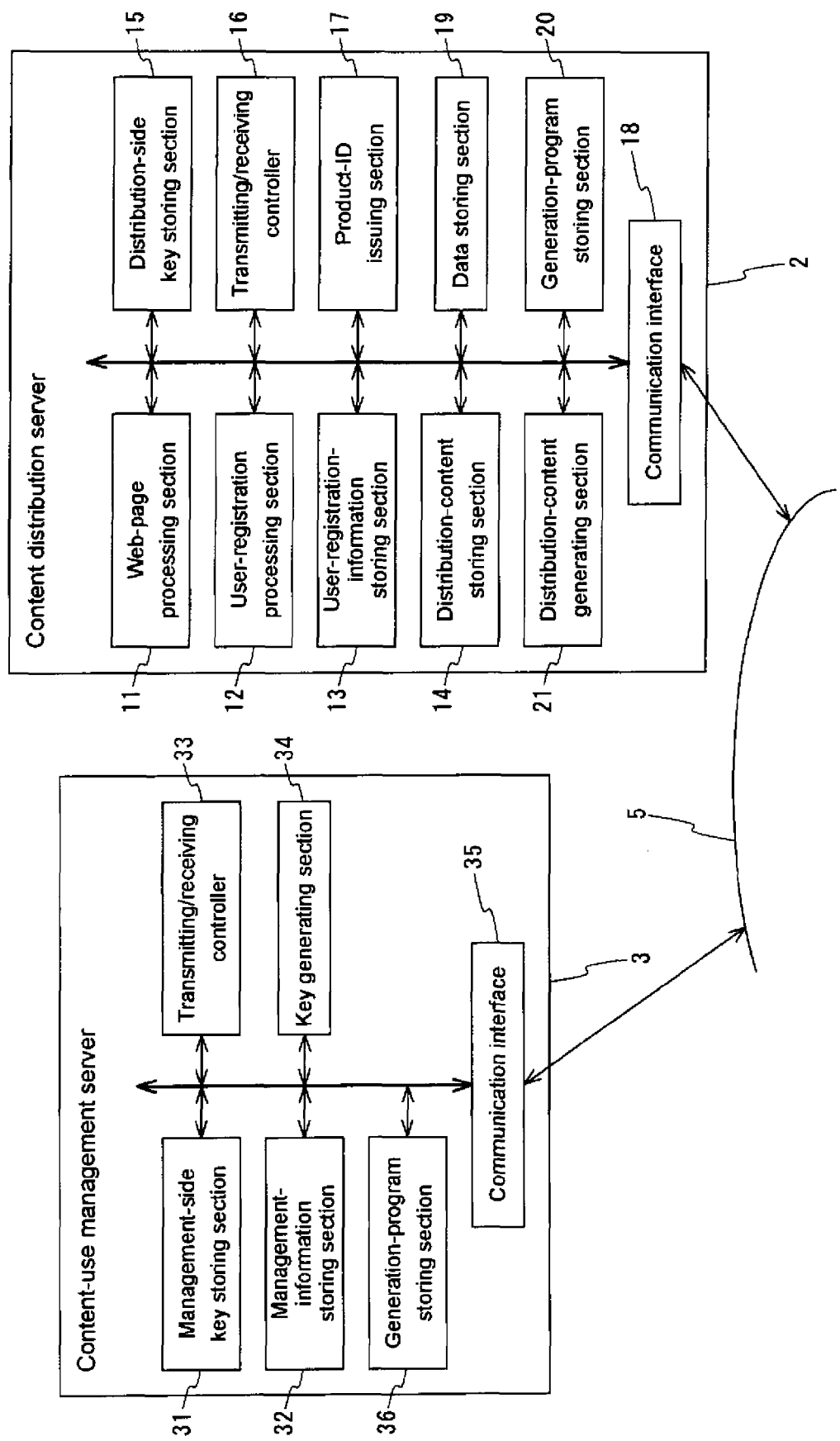
FIG. 2 is a block diagram showing a schematic configuration of a content distribution server, a content-use management server, or the like, according to the embodiment.
Figure 3:
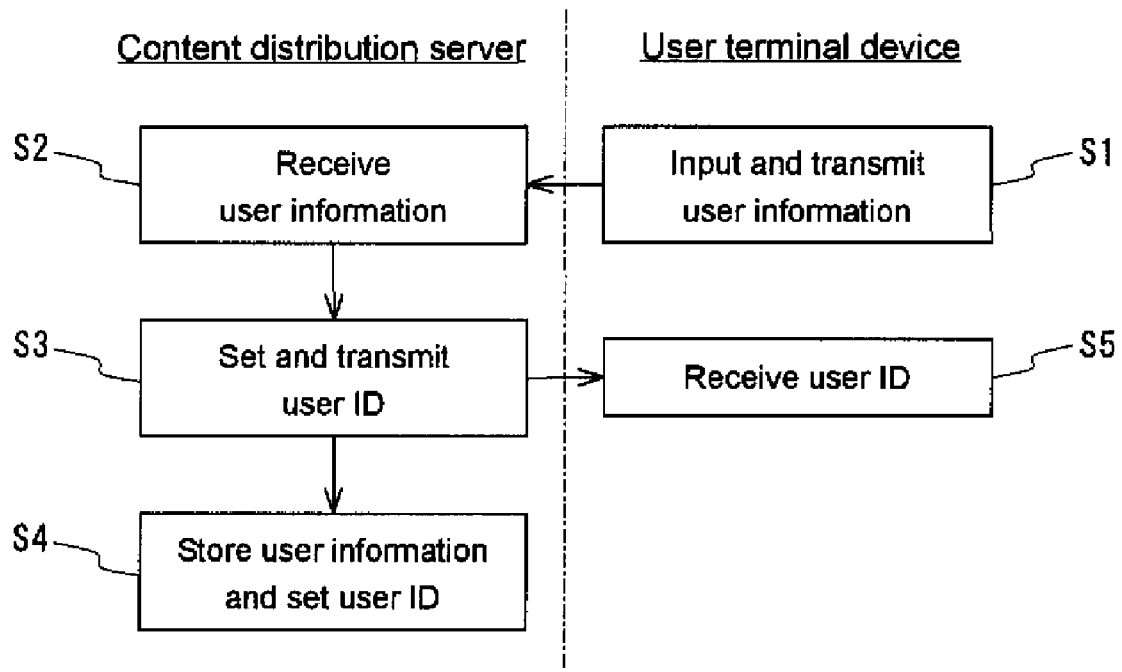
FIG. 3 is a flowchart for describing a process in a user-registration processing section according to the embodiment.

Hereinafter, a specific embodiment of the present invention will be described with reference to the accompanying drawings. FIG. 1 is a block diagram showing a schematic configuration of a content distribution system according to one embodiment of the present invention, and FIG. 2 is a block diagram showing a schematic configuration of the content distribution server, a content-use management server, or the like, according to the embodiment.

As shown in FIG. 1, a content distribution system 1 of the embodiment is configured such that a content distribution server 2, a content-use management server 3, and a plurality of user terminal devices 4 are connected via Internet 5 to each other. The content distribution server 2 functions as an Internet server such as a WWW server, or the like, and a server provided with a CGI script, or the like, and the user terminal devices 5 each function as clients provided with a Web browser.

The content distribution server 2 is formed of a computer provided with a CPU, a ROM, a RAM, a hard disk, or the like. As shown in FIG. 2, the content distribution server 2 is provided with: a web-page processing section 11; a user-registration processing section 12; a user-registration-information storing section 13, a distribution-content storing section 14; a distribution-side key storing section 15; a transmitting/receiving controller 16; a product-ID issuing section 17; a data storing section 19; a generation-program storing section 20; a distribution-content generating section 21; a communication interface 18; and other components. The content distribution server 2 is connected via the communication interface 18 with the Internet 5.

The web-page processing section 11 performs a process for publishing a website for distributing a content on the Internet 5, and via the website, a user registration and a distribution processing of a distribution content file described later are performed.

The user-registration processing section 12 performs a process for registering a system user (user) based on information inputted via the website from the user terminal device 4. Specifically, as shown in FIG. 31 in the user-registration processing section 12, when registration information such as private information (a name, an address, a credit card number, an E-mail address, a password, etc.) or the like of the user is inputted via the website from the user terminal device 4 (step S1), the inputted private information of the user is accepted (step S2), an ID number is set to the user, and the set ID number (user ID) is transmitted to the user terminal device 4 (step S3), and at the same time, the accepted private information of the user and the set user ID are stored in the user-registration-information storing section 13 (step S4). In the user terminal device 4, the transmitted user ID is received and displayed (step S5).

In the data storing section 19, content data are stored. The content data include data related to information of text, audio, video, or the like (a novel, an essay, music, a movie, a picture, a painting, a design, or the like) converted into a data format; or a computer program such as game software. The content data are configured not to include a reproducing program for reproducing the content data but to be reproduced by an appropriate reproducing program stored in advance on a side of the user terminal device 4, or configured to include the reproducing program, and to be reproduced by the reproducing program on the side of the user terminal device 4.

Figure 4:
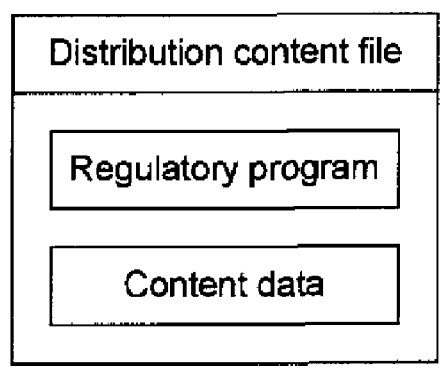
FIG. 4 is an explanatory diagram showing a data configuration of data stored in a distribution-content storing section according to the embodiment.

The generation-program storing section 20 stores a generation program transmitted from the content-use management server 3. The distribution-content generating section 21 executes the generation program stored in the generation-program storing section 20 thereby to add to the content data stored in the data storing section 19 a regulatory program which is a program for regulating reproduction of the content data and includes a first key required for the regulation. At the same time, the distribution-content generating section 21 performs a process in which the content data are encrypted by the first key in the regulatory program, and a distribution content file, which is subject to distribute as shown in FIG. 4, is generated, and a process for generating a second key which forms a pair with the first key of the regulatory program and which is encrypted by an appropriate key.

The regulatory program is configured, when the distribution content file is opened on the user terminal device 4, to execute the regulatory program and thereafter, to reproduce the content data.

Further, the regulatory program is configured, firstly, to perform on the user terminal device 4 a process for confirming whether there is previously set key input (whether there is predetermined key input previously set as one operation for not forcedly performing a deregulating process), and when there is the key input, to perform a process for reproducing the content data. On the other hand, when there is no key input, the regulatory program firstly performs a process for confirming whether an execution is for a first time. In the case of the first execution, the regulatory program is configured to generate the ID number (terminal ID (terminal identification information)) based on unique information of the user terminal device 4, for example, a CPU number, a hard disk number, or the like, and at the same time, to perform a process in which a product ID, described later, inputted by the user into the user terminal device 4 is accepted and the generated terminal ID and the accepted product ID are transmitted to the content distribution server 2; a process in which a third key, described later, transmitted from the content distribution server 2 is received, information each corresponding to the second key and the terminal ID, described later, are recognized from the received third key, whether the recognized second key is a key which forms a pair with the first key in the regulatory program is confirmed, and whether the recognized terminal ID agrees with the generated terminal ID is confirmed; and a process in which when the recognized second key is the key which forms a pair with the first key and the recognized terminal ID agrees with the generated terminal ID, the content data are decoded by the second key so that the content data are reproduced, and the generated terminal ID is stored within a storing section of the user terminal device 4. On the other hand, when the execution is other than the first time, the regulatory program is configured to generate the terminal ID once again, and to perform a process for confirming whether the re-generated terminal ID agrees with the terminal ID stored within the storing section of the user terminal device 4 and a process in which when agreement is determined, the content data are reproduced.

The distribution-content storing section 14 is stored with a plurality of kinds of distribution content files generated by the distribution-content generating section 21. Each distribution content file within the distribution-content storing section 14 is provided with the content data different to one another, and the first key in each regulatory program of the distribution content file differs by each content data.

As shown in FIG. 5, the distribution-side key storing section 15 is stored with: distribution-content file names; the product IDs, described later, which are previously registered numbers; and the encrypted second keys which are generated by the distribution-content generating section 21 and which form pairs with the first keys in the regulatory programs of the distribution content files specified by the product IDs, in a manner to be associated with one another.

The transmitting/receiving controller 16 performs: a process for receiving the generation program transmitted from the content-use management server 3 and storing the generation program in the generation-program storing section 20; a process for transmitting, in response to a request from the user terminal device 4, the distribution content file stored in the distribution-content storing section 14 to the user terminal device 4; a process for transmitting to the user terminal device 4 the product ID set by the product-ID issuing section 17; a process in which when the terminal ID and the product ID transmitted from the user terminal device 4 are received, the data stored in the distribution-side key storing section 15 are referred to based on the received product ID to recognize the second key associated with the product ID, and the recognized second key, and the received terminal ID and product ID are transmitted to the content-use management server 3; and a process in which the third key, described later, transmitted from the content-use management server 3 is received and transmitted to the user terminal device 4.

When the distribution content file stored in the distribution-content storing section 14 is transmitted to the user terminal device 4, under the control of the transmitting/receiving controller 16, in response to a request from the user terminal device 4, the product-ID issuing section 17 performs a process in which the ID number (distribution-file identifying information), set by each transmitted distribution content file, for individually identifying the distribution content file, is set out of previously registered numbers, and the set ID number (product ID) is transmitted, under the control of the transmitting/receiving controller 16, to the user terminal device 4.

Similar to the content distribution server 2, the content-use management server 3 is formed of a computer provided with a CPU, a ROM, a RAM, a hard disk, or the like. As shown in FIG. 2, the content-use management server 3 is provided with: a management-side key storing section 31; a management-information storing section 32; a transmitting/receiving controller 33; a key generating section 34; a generation-program storing section 36; a communication interface 35; and other components, and connected via the communication interface 35 with the Internet 5.

In the generation-program storing section 36, the generation program for generating the distribution content file and the second key are appropriately created in advance and stored therein. The management-side key storing section 31 is stored with key information for decoding each of the encrypted second keys which is generated as a result of the generation program being executed by the distribution-content generating section 21.

In the management information storing section 32, as shown in FIG. 6, the distribution-content file names; the product IDs which are previously registered-numbers; and management information by each product ID are associated with one other and stored therein. The management information includes, for example, the number of times in which and a period during which the third key, described later, can be generated, a past generation record of the third key, or the like.

The transmitting/receiving controller 33 performs a process in which the generation program stored in the generation-program storing section 36 is transmitted to the content distribution server 2; a process in which the terminal ID, the product ID, and the encrypted second key transmitted from the transmitting/receiving controller 15 of the content distribution server 2 are received; and a process in which the third key generated by the key generating section 34 is transmitted to the user terminal device 4.

When the terminal ID, the product ID, and the encrypted second key transmitted from the transmitting/receiving controller 15 of the content distribution server 2 are received by the transmitting/receiving controller 33, the key generating section 34 performs a process in which based on the received product ID, the data stored in the management-information storing section 32 are referred to in order to confirm whether a certain condition is satisfied based on the management information corresponding to the product ID; a process in which when the certain condition is satisfied (when the past generation record of the third key does not reach the number of times in which the third key can be generated, and when within the period during which the third key can be generated), the key information stored in the management-side key storing section 31 is referred to based on the encrypted received second key to decode the encrypted second key, and based on the decoded second key and the received terminal ID, the third key including these pieces of information is generated; a process in which the past generation records of the third key, which correspond to the received product IDs and are stored in the management-information storing section 32, are updated; and a process in which the generated third key is transmitted to the content distribution server 2, under the control of the transmitting/receiving controller 33.

According to the thus-configured content distribution system 1 of the embodiment, firstly, the generation program stored in the generation-program storing section 36 is transmitted to the content distribution server 2 by the transmitting/receiving controller 33 of the content-use management server 3. The transmitted generation program is received by the transmitting/receiving controller 16 of the content distribution server 2 and stored in the generation-program storing section 20.

Thereafter, when the generation program stored in the generation-program storing section 20 is executed by the distribution-content generating section 21, the regulatory program is added to the content data stored in the data storing section 19, whereby the distribution content file including the content data and the regulatory program is generated, and at the same time, the encrypted second key which form a pair with the first key in the regulatory program is generated. The generated distribution-content file is stored in the distribution-content storing section 14, and the generated second key is stored in the distribution-side key storing section 15.

Figure 7:
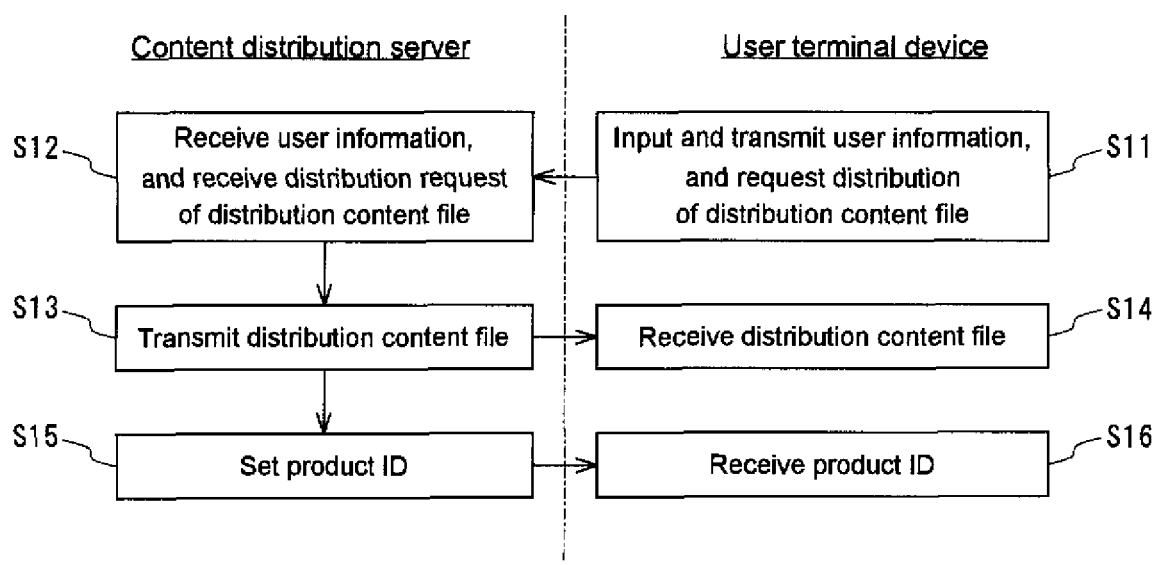
FIG. 7 is a flowchart for describing a distribution process according to the embodiment.

In this manner, when the distribution-content file is stored in the distribution-content storing section 14, the distribution content file is transmitted to the user terminal device 4 from the content distribution server 2, as shown in FIG. 7. Further, when the distribution content file transmitted to the user terminal device 4 is opened, the regulatory program (authentication process) is executed as shown in FIG. 8 and FIG. 9, and thereafter, the content data are reproduced.

That is, as shown in FIG. 7, the personal identification information such as the user ID, the password, etc., and information for specifying a desired distribution content file selected by the user are inputted via the website from the user terminal device 4 (step S11). When these pieces of information are accepted by the transmitting/receiving controller 16 of the content distribution server 2 (step S12), the transmitting/receiving controller 16 reads out the distribution content file in the distribution-content storing section 14 based on accepted distribution-content file specifying information, and transmits it to the user terminal device 4 (step S13).

The distribution content file transmitted by the transmitting/receiving controller 16 is received by the user terminal device 4 and stored therein (step S14). When the distribution content file is transmitted to the user terminal device 4 by the transmitting/receiving controller 16, the product-ID issuing section 17 sets the product ID, which is set by each transmitted distribution content file, for individually identifying the distribution content file, out of the previously registered numbers, and transmits the product ID to the user terminal device 4, under the control of the transmitting/receiving controller 16 (step S15). The transmitted product ID is received by the user terminal device 4 and stored therein (step S16).

Figure 8:
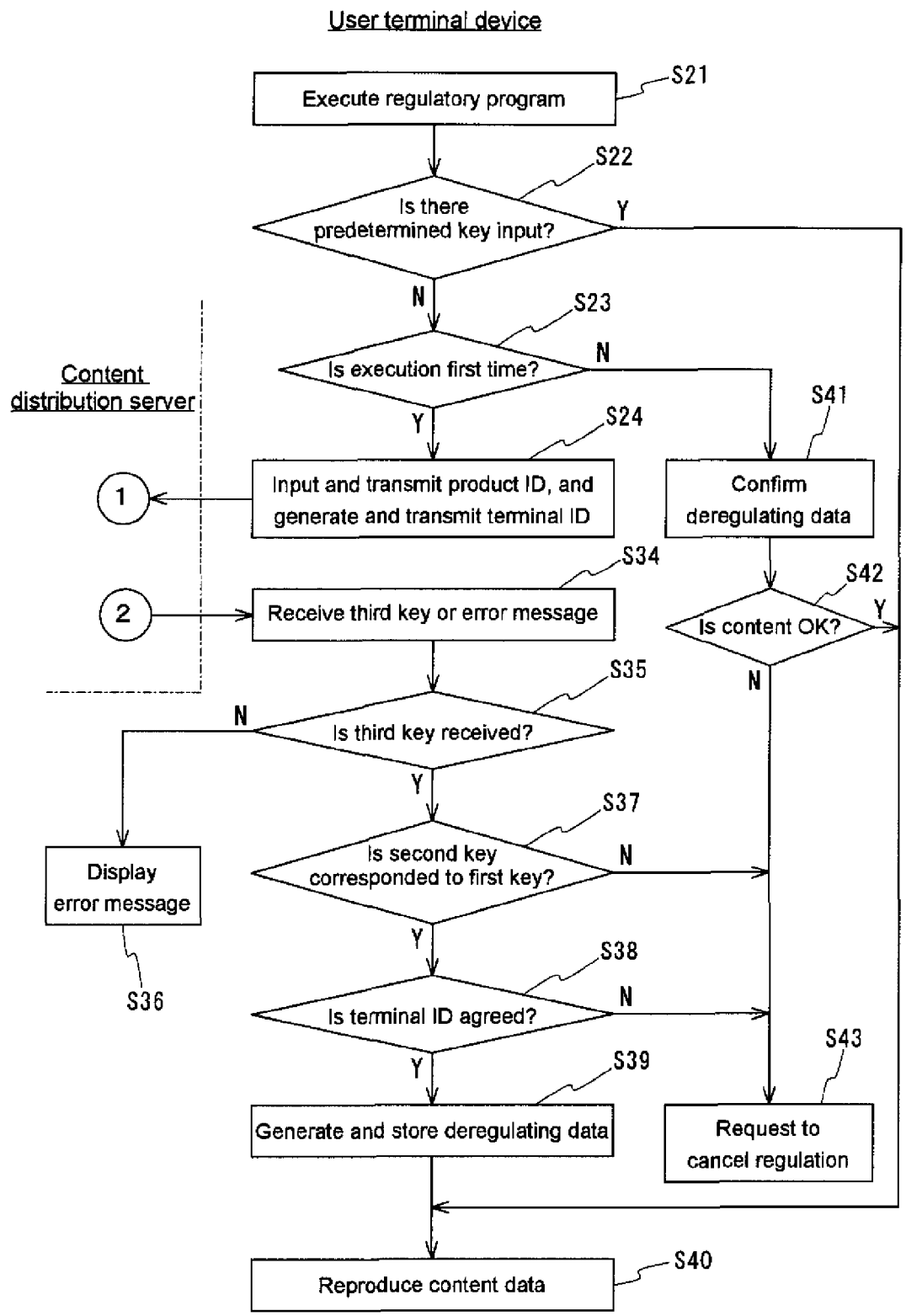
FIG. 8 is a flowchart for describing a deregulating process according to the embodiment.
Figure 9:
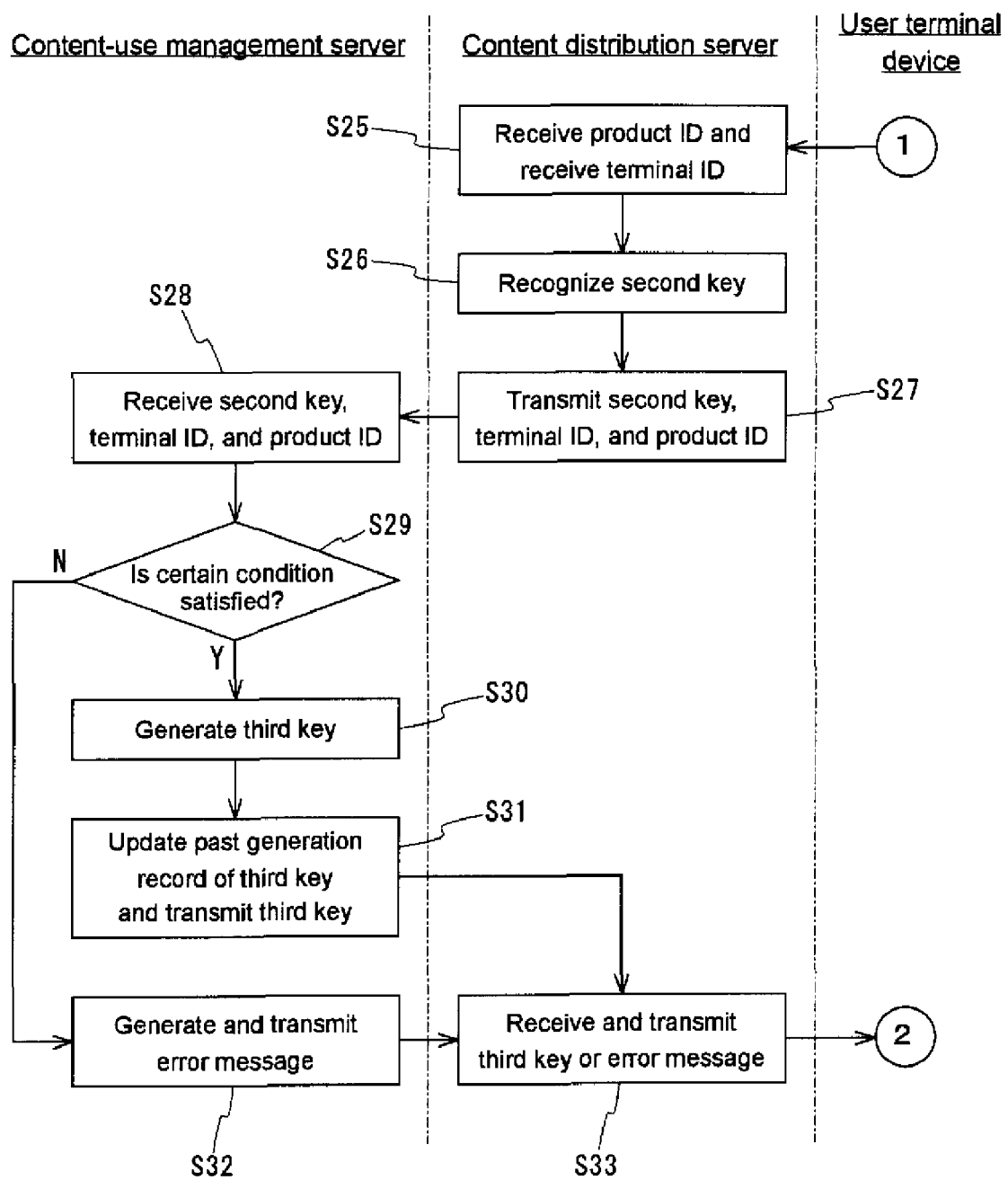
FIG. 9 is a flowchart for describing the deregulating process according to the embodiment.

Thereafter, when the distribution content file stored in the user terminal device 4 is opened on the user terminal device 4, the regulatory program is executed as shown in FIG. 8 and FIG. 9 (step S21). The regulatory program, firstly, performs a process in which whether there is previously set key input (whether there is predetermined key input which is previously set as one of the operations for not forcedly performing a deregulating process) is confirmed (step S22). When there is no key input, the regulatory program performs a process in which whether the regulatory program is executed for a first time is confirmed (step S23). It is noted that whether the regulatory program is executed for the first time is determined whether there are deregulating data generated and stored at step S39 described later. When there are no deregulating data, the first time is determined, and when there are the deregulating data, other than the first time is determined. On the other hand, when there is the input at the step S21, the process proceeds to step S40.

When the first time is determined at the step S23, performed is a process in which the terminal ID based on the unique information (a CPU number, a hard disk number, etc.) of the user terminal device 4 is generated, the product ID, which is inputted to the user terminal device 4 by the user, set by the product-ID issuing section 17 and transmitted to the user terminal device 4 is accepted, and the generated terminal ID and the accepted product ID are transmitted to the content distribution server 2 is performed (step S24).

The terminal ID and the product ID transmitted from the user terminal device 4 is received by the transmitting/receiving controller 16 of the content distribution server 2 (step S25). The transmitting/receiving controller 16 refers to the data in the distribution-side key storing section 15 based on the received product ID to recognize the second key associated with the product ID (step S26). The transmitting/receiving controller 16 transmits to the content-use management server 3 the recognized second key and the received terminal ID and product ID (step S27).

The second key, the terminal ID, and the product ID transmitted by the transmitting/receiving controller 16 are received by the transmitting/receiving controller 33 of the content-use management server 3 (step S28). The key generating section 34 performs a process of generating the third key, and other processes, based on the received second key, terminal ID, and product ID.

Specifically, firstly, the key generating section 34 refers to the data in the management-information storing section 32 based on the received product ID to confirm whether a certain condition is satisfied based on the management information corresponding to the product ID (step S29). When it is determined that the certain condition is satisfied (when the past generation record of the third key does not reach the number of times in which the third key can be generated, and within the period during which the third key can be generated), the key generating section 34 refers to the key information within the management-side key storing section 31 based on the encrypted and received second key to decode the encrypted second key, and generates, based on the decoded second key and the received terminal ID, the third key including these pieces of information (step S30).

Subsequently, the generation record of the third key corresponding to the received product ID, within the management-information storing section 32, is updated, and the generated third key is sent back to the content distribution server 2 under the control of the transmitting/receiving controller 33 (step S31). On the other hand, when it is determined at the step S29 that the certain condition is not satisfied, an error message is generated and sent back to the content distribution server 2 under the control of the transmitting/receiving controller 33 (step S32).

The third key or the error message sent back by the transmitting/receiving controller 33 is received by the transmitting/receiving controller 16 of the content distribution server 2, and thereafter, further sent back to the user terminal device 4 (step S33).

The third key or the error message sent back by the transmitting/receiving controller 16 follows the regulatory program and is received by the user terminal device 4 (step S34). The regulatory program performs on the user terminal device 4 a process for confirming whether the received information is the third key or the error message (step S35), and in the case of the error message, the regulatory program performs a process for display the error message on a display device of the user terminal device 4 (step S36).

On the other hand, when it is determined that the received information is the third key at the step S35, the information each corresponding to the second key and the terminal ID are recognized from the received third key, and a process for confirming whether the recognized second key is a key which forms a pair with the first key in the regulatory program is performed (step S37). When it is determined that the key forms the pair, a process for confirming whether the recognized terminal ID agrees with the terminal ID generated at the step S24 is further performed (step S38).

When the agreement is determined at the step S38, performed is a process in which the deregulating data formed of the second key, the terminal ID, or the like are generated and stored in the appropriate storing section of the user terminal device 4, and at the same time, an address of the storing section (storing address) in which the deregulating data are stored is added to the deregulating data (step S39). Then, the process proceeds to step S40.

On the other hand, when other than the first time is determined at the step S23, a process for confirming a content of the deregulating data generated and stored at the step S39 is performed (step S41), and a process for determining whether the content is correct is performed (step S42). Specifically, the terminal ID based on the unique information of the user terminal device 4 is generated again, whether the re-generated terminal ID agrees with the terminal ID of the deregulating data is confirmed, and whether the address of the storing section in which the deregulating data are stored agrees with the storing address of the deregulating data is confirmed.

In the case where the re-generated terminal ID agrees with the terminal ID of the deregulating data, and the address of the storing section in which the deregulating data are stored agrees with the storing address of the deregulating data at the step S42, the process proceeds to the step S40, and at the step S40, performed is a process in which an appropriate reproducing program previously stored on the side of the user terminal device 4 and an appropriate reproducing program in the distribution content file are executed to reproduce the content data.

It is noted that the reproducing means that in the case where music is converted into a data format, a sound of the music is outputted to a speaker of the user terminal device 4; in the case where a movie is converted into a data format, the movie is projected on the display device of the user terminal device 4; in the case where a novel or the like is converted into a data format, sentences or the like of the novel is displayed on the display device; and in the case of game software, the game software is rendered usable on the user terminal device 4.

On the other hand, when it is determined that the recognized second key is not the key which forms a pair with the first key in the regulatory program at the step S37; when it is determined that the recognized terminal ID does not agree with the terminal ID generated at the step S24 at the step S38; and when the re-generated terminal ID does not agree with the terminal ID of the deregulating data or the address of the storing section in which the deregulating data are stored does not agree with the storing address of the deregulating data at the step S42; and when the address of the storing section of the deregulating data stored at the step S39 is changed, the process proceeds to step S43 to perform a process in which a message requesting to cancel the regulation by the regulatory program is generated and is displayed on the display device of the user terminal device 4 (step S43).

As described in detail, according to the content distribution system 1 of the present embodiment, unless the second key in the third key transmitted from the content-use management server 3 forms a pair with the first key in the regulatory program of the distribution content file, and the terminal ID in the third key agrees with the terminal ID of the user terminal device 4, the reproduction of the content data in the distribution content file is regulated by the regulatory program. Therefore, even when the distribution content file is illegally copied, and in addition, the information related to the third key is known, the terminal ID differs by each user terminal device 4, and thus, the regulation by the regulatory program cannot be cancelled. Thereby, the unauthorized use of the content can be effectively prevented.

Further, the first key in the regulatory program is changed by each content data, and thus, the second key which forms a pair with the first key can be changed by each content data. As a result, a misappropriation or the like of the third key among the content data (distribution content file) can be prevented, and thus, the unauthorized use of the content can be more surely prevented.

Further, the key generating section 34 of the content-use management server 3 is configured such that it refers to the management information stored in the management-information storing section 32 based on the product ID, and only when the certain condition is satisfied, the third key is generated. Thus, it becomes possible to finely restrict the use of a user by each product ID and each distribution content file (content data), and thus, the unauthorized use of the content can be further effectively prevented.

Further, the present invention is configured such that the content data of the distribution content file is encrypted by the first key in the regulatory program and the content data are decoded by the second key in the third key, and thus, the unauthorized use of the content can be more effectively prevented.

Further, the regulatory program is executed at each time that the distribution content file is opened. In addition, the number of times of execution is confirmed, and when the number of times is a second time and so forth, the terminal ID is regenerated, and whether the terminal ID agrees with the terminal ID of the deregulating data and whether the address of the storing section in which the deregulating data are stored agrees with the storing address of the deregulating data is confirmed. Thus, the unauthorized use of the content can be more surely prevented.

This is because when the distribution content file is copied and stored in a different user terminal device 4, the terminal ID and the address of the storing section in which the deregulating data are stored is differed, and thus, the reproduction of the copied content data can be effectively prevented. Further, when the present invention is configured such that the regulatory program is executed only when the distribution content file is opened for the first time, for example, after the regulatory program is once executed and the restriction by the regulatory program is canceled, the content becomes usable without any restrictions. Thus, such inconvenience can be eliminated.

At the time of the execution for the second time and so forth, the transmission and the reception of the data is not performed among the user terminal device 4, the content distribution server 2, and the content-use management server 3. Thus, the restriction by the regulatory program can be effectively canceled.

When predetermined key input (predetermined key input for not forcedly performing the deregulating process) is performed by the user into the user terminal device 4, the regulation is designed to be canceled without performing the transmission and reception of the data among the user terminal device 4, the content distribution server 2, and the content-use management server 3. It is, therefore, favorable for a case where any error or the like occurs, and the error does not allow the normal deregulating process (the processes of the step S23 to the step S43) to be executed.

Further, based on the generation program stored in the generation-program storing section 20, the distribution-content file including the content data and the regulatory program, and the second key which forms a pair with the first key in the regulatory program of the distribution content file are automatically generated by the distribution-content generating section 21. Thus, it is possible to effectively generate the distribution content file and the second key.

Thus, one embodiment of the present invention has been described above. However, specific modes in which the present invention can be realized are not limited thereto.

The above-described embodiment is configured such that based on the product ID, the second key stored in the distribution-side key storing section 15 and the management information stored in the management information storing section 32 are recognized, but is not limited thereto. It may be possible that the content identifying information for identifying the content data, the distribution content file name, the second key which forms a pair with the first key in the regulatory program corresponding to the content data specified by the content identifying information are associated with one another and stored in the distribution-side key storing section 15, and that the content identifying information, the distribution content file name, the management information by each content identifying information are associated with one another and stored in the management-information storing section 32, and based on the content identifying information, the second key stored in the distribution-side key storing section 15 and the management information stored in the management-information storing section 32 are recognized.

It is noted that regarding the content identifying information, for example, the content identifying information previously informed to the user is inputted by the user, together with the generated terminal ID, is transmitted from the user terminal device 4 to the content distribution server 2 and the content-use management server 3, or the content identifying information included in the distribution content file, together with the generated terminal ID, is automatically transmitted from the user terminal device 4 to the content distribution server 2 and the content-use management server 3.

Further, the content identifying information, the user ID, the second key, and the distribution content file are associated with one another and stored in the distribution-side key storing section 15, or the content identifying information, the user ID, the management information, and the distribution content file are associated with one another and stored in the management information storing section 32, and based on the generated terminal ID, content identifying information, and the inputted user ID, which are transmitted from the user terminal device 4 to the content distribution server 2 or the content-use management server 3, the second key and the management information may be recognized.

In the above-described embodiment, the present invention is configured such that the generation program stored in the generation-program storing section 36 of the content-use management server 3 is transmitted to the content distribution server 2, and the distribution content file and the second key are generated by the distribution-content generating section 21 of the content distribution server 2, but is not limited thereto. As shown in FIG. 10, the content distribution server 2 may be configured by: the web-page processing section 11; the user-registration processing section 12; the user-registration-information storing section 13; the distribution-content storing section 14; the distribution-side key storing section 15; the transmitting/receiving controller 16; the product-ID issuing section 17; the data storing section 19; and the communication interface 18. The content-use management server 3 may be configured by: the management-side key storing section 31; the management-information storing section 32; the transmitting/receiving controller 33; the key generating section 34; the generation-program storing section 36; a data storing section 37; a distribution-content generating section 38; a distribution-content storing section 39; and the communication interface 35.

In this case, the content data stored in the data storing section 19 of the content distribution server 2 are transmitted to the content-use management server 3; the transmitted data are stored in the data storing section 37 of the content-use management server 3; and based on the stored content data and the generation program stored in the generation-program storing section 36, the distribution-content file and the second key are generated by the distribution-content generating section 38. The generated distribution content file and second key are then stored in the distribution content storing section 39 and the management-side key storing section 31, and thereafter, the stored data are transmitted to the content distribution server 2, and the transmitted data are stored in the distribution-content storing section 14 and the distribution-side key storing section 15, respectively.

When the content is game software or the like, there is a case where in order that the user can understand what is involved in the game, content data, called a trial version, which allow the user to use a small portion of the content for free of charge, are distributed. In this case, there is a need of preparing content data of the trial version and that of a legitimate set, which is not the trial version. When the content data of the trial version and that of the legitimate set are combined in one distribution content file, and if the deregulating process is executed by the regulatory program, the content in the legitimate set becomes usable. In this way, it becomes effective because sharing of the data between the trial version and the legitimate set can be implemented, and so on. For example, when the user pays the appropriate service charge, the management information stored in the management-information storing section 32 is changed to a state capable of generating the third key, and thus, the regulation by the regulatory program is cancelled, thereby executing the content data related to the legitimate set on the user terminal device 4.

Further, the content distribution server 2 and the content-use management server 3 may be integrally arranged.

INDUSTRIAL APPLICABILITY

As described in detail above, the present invention is suitable as a content distribution server capable of more surely preventing the unauthorized use of a content, and as a content distribution system using the same.

The invention claimed is:

1. A content distribution server arranged to be connectable via a telecommunication circuit to a user terminal device, comprising:
    a distribution-content storing section which stores a distribution content file subject to distribution, the distribution content file being composed of: content data; and a regulatory program for enforcing a regulation reproducing the content data, the regulatory program including a first key required for the regulation;
    a key storing section for storing a second key which forms a pair with the first key;
    a key generating section for generating, when receiving terminal identification information transmitted from the user terminal device, based on the received terminal identification information and the second key stored in the key storing section, a third key including these pieces of information; and a transmitting controller for transmitting, in response to a request from the user terminal device, to the user terminal device the distribution content file stored in the distribution-content storing section, and transmitting to the user terminal device the third key generated by the key generating section, wherein the regulatory program is configured to:

when the distribution content file is opened on the user terminal device at least for a first time, firstly execute the regulatory program, and thereafter, reproduce the content data; and to perform a process in which on the user terminal device, the terminal identification information based on unique information of the user terminal device is generated and is transmitted to the content distribution server, a process in which the third key transmitted from the content distribution server is received, information corresponding to the second key and the terminal identification information are each recognized from the received third key, whether the recognized second key is a key which forms a pair with the first key in the regulatory program is confirmed, and whether the recognized terminal identification information agrees with the generated terminal identification information is confirmed, and a process in which when the recognized second key is the key which forms a pair with the first key and the recognized terminal identification information agrees with the generated terminal identification information, the content data are reproduced.

2. The content distribution server according to claim 1, wherein the distribution-content storing section is stored with a plurality of distribution content files each provided with the different content data, the regulatory program is configured such that the first key is differed depending on the content data, and is configured to transmit, upon performing a process for transmitting the terminal identification information to the content distribution server, the content identification information for identifying the content data, together with the terminal identification information, the key storing section is stored with the content identification information and the second key which forms a pair with the first key in the regulatory program corresponding to the content data specified by the content identification information in a manner to be associated with each other, the key generating section is configured, when receiving the terminal identification information and the content identification information transmitted from the user terminal device, to refer to data stored in the key storing section based on the received content identification information, recognize the second key associated with the content identification information, and generate, based on the recognized second key and the received terminal identification information, the third key including these pieces of information.

3. The content distribution server according to claim 2, wherein the key generating section confirms, upon generating the third key, whether a certain condition previously set by each content identification information is satisfied, and when satisfied, generates the third key.

4. The content distribution server according to claim 1, wherein the distribution-content storing section is stored with a plurality of distribution content files each provided with the different content data, the regulatory program is configured such that the first key is differed depending on the content data, and is configured, upon performing a process for transmitting the terminal identification information to the content distribution server, to transmit distribution-file identification information for individually identifying the distribution content files, the distribution-file identification information being set by each distribution content file transmitted to the user terminal device, together with the terminal identification information, the key storing section is stored with the distribution-file identification information and the second key which forms a pair with the first key in the regulatory program in the distribution content file specified by the distribution-file identification information in a manner to be associated with each other, the key generating section, when receiving the terminal identification information and the distribution-file identification information transmitted from the user terminal device, refers to data stored in the key storing section based on the received distribution-file identification information, recognizes the second key associated with the distribution-file identification information, and generates, based on the recognized second key and the received terminal identification information, the third key including these pieces of information.

5. The content distribution server according to claim 4, wherein the key generating section confirms, upon generating the third key, whether a certain condition previously set by each distribution-file identification information is satisfied, and when satisfied, generates the third key.

6. The content distribution server according to any one of claims 1 to 5, wherein the distribution-content storing section is stored with a distribution content file provided with content data encrypted by the first key in the regulatory program, and the regulatory program decodes, upon performing a process for reproducing the content data, the content data by the second key.

7. The content distribution server according to claim 6, wherein the regulatory program is configured, firstly, to perform a process for confirming whether an execution is a first time, and when the execution is the first time, the regulatory program further performs, in addition to each of the processes, a process for storing the generated terminal identification information into a storing section of the user terminal device, and when the execution is other than the first time, the regulatory program performs a process in which the terminal identification information is generated again, and whether the re-generated terminal identification information agrees with the terminal identification information stored in the storing section of the user terminal device is confirmed, and when agreement is determined, a process for reproducing the content data.

8. The content distribution server according to claim 7, further comprising:

a data storing section for storing the content data; and a distribution-content generating section for generating the distribution content file by adding the regulatory program to the content data stored in the data storing section, generating the second key which forms a pair with the first key of the regulatory program, and storing the generated distribution content file into the distribution-content storing section and the generated second key into the key storing section.

9. A content distribution system configured such that a content distribution server and a user terminal device are connected via a telecommunication circuit, wherein the content distribution server is formed of a content distribution server according to claim 8.

* * * * *